US012580614B2

(12) United States Patent
Göransson et al.

(10) Patent No.: US 12,580,614 B2
(45) Date of Patent: **\*Mar. 17, 2026**

(54) METHODS AND ARRANGEMENTS FOR SIGNALING CONTROL INFORMATION IN A COMMUNICATION SYSTEM

(71) Applicant: TELEFONAKTIEBOLAGET LME ERICSSON (PUBL), Stockholm (SE)

(72) Inventors: Bo Göransson, Sollentuna (SE); George Jöngren, Sundbyberg (SE)

(73) Assignee: Telefonaktiebolaget LM Ericsson (publ), Stockholm (SE)

( \* ) Notice: Subject to any disclaimer, the term of this patent is extended or adjusted under 35 U.S.C. 154(b) by 0 days.

This patent is subject to a terminal disclaimer.

(21) Appl. No.: 17/381,695

(22) Filed: Jul. 21, 2021

(65) Prior Publication Data

US 2021/0351822 A1 Nov. 11, 2021

Related U.S. Application Data

(63) Continuation of application No. 15/830,065, filed on Dec. 4, 2017, now Pat. No. 11,108,445, which is a (Continued)

(51) Int. Cl.
*H04B 7/0456* (2017.01)
*H04B 7/0417* (2017.01)
(Continued)

(52) U.S. Cl.
CPC ......... *H04B 7/0486* (2013.01); *H04B 7/0417* (2013.01); *H04B 7/0456* (2013.01); (Continued)

(58) Field of Classification Search
CPC ...................................... H04B 7/0417–7/0897
See application file for complete search history.

(56) References Cited

U.S. PATENT DOCUMENTS 5,974,300 A \* 10/1999 LaPorta .................. H04W 4/14
340/7.29
2007/0011550 A1\* 1/2007 Agrawal .............. H04B 7/0697
714/746
(Continued)

FOREIGN PATENT DOCUMENTS

CN 1647438 A 7/2005
CN 101228712 A 7/2008
(Continued)

OTHER PUBLICATIONS

Downlink Control Signaling for SU-MIMO, 3GPP TSG RAN WG1 Meeting #50bis, R1-074194, LG Electronics, Oct. 8-12, 2007, p. 1-7, available at https://www.3gpp.org/ftp/tsg_ran/WG1_RL1/TSGR1_50b/Docs (Year: 2007).\*
(Continued)

*Primary Examiner* — Gennadiy Tsvey

(57) ABSTRACT

The invention relates to devices and methods for signalling control information associated with transmission of data over a wireless channel. A second communication device receives (S2) data from a first communication device, wherein the data comprises an indication of recommended precoders and a recommendation of a first transmission rank to possibly use during transmission. The second communication device determines (S4) a second transmission rank to use for transmitting data, and transmits (S6) a confirmation message to the first communication device. The confirmation message comprises a confirmation that transmission of data from the second communication device is using at least parts of each recommended precoder associated with a frequency resource that falls within the transmission of data and an indicator of the second transmission rank to use.

11 Claims, 9 Drawing Sheets

Related U.S. Application Data continuation of application No. 15/084,905, filed on Mar. 30, 2016, now Pat. No. 9,838,099, which is a continuation of application No. 14/108,823, filed on Dec. 17, 2013, now Pat. No. 9,614,602, which is a continuation of application No. 12/682,161, filed as application No. PCT/SE2008/051138 on Oct. 7, 2008, now Pat. No. 8,626,081.

(60) Provisional application No. 60/978,226, filed on Oct. 8, 2007.

(51) Int. Cl.
| | |
|---|---|
| *H04B 7/06* | (2006.01) |
| *H04W 72/21* | (2023.01) |
| *H04W 72/542* | (2023.01) |

(52) U.S. Cl.
CPC ........... *H04B 7/063* (2013.01); *H04B 7/0639* (2013.01); *H04B 7/0654* (2013.01); *H04W 72/21* (2023.01); *H04W 72/542* (2023.01)

(56) References Cited

U.S. PATENT DOCUMENTS

| | | | | |
|---|---|---|---|---|
| 2007/0217540 | A1 | 9/2007 | Onggosanusi | |
| 2007/0274411 | A1* | 11/2007 | Lee ...................... | H04B 7/0456 |
| | | | | 375/267 |
| 2008/0186934 | A1* | 8/2008 | Khan .................... | H04L 1/0046 |
| | | | | 370/342 |

FOREIGN PATENT DOCUMENTS

| | | | |
|---|---|---|---|
| WO | 2003/088552 | A1 | 10/2003 |
| WO | 2006/130541 | A2 | 12/2006 |
| WO | 2007/051154 | A2 | 5/2007 |
| WO | 2007/051192 | A2 | 5/2007 |
| WO | 2007/109630 | A1 | 9/2007 |
| WO | 2009/048418 | A2 | 4/2009 |

OTHER PUBLICATIONS

On the implementation of rank override using codeword DTX, 3GPP TSG RAN WG1 #50bis, R1-074200, LG Electronics, Oct. 8-12, 2007, p. 1-3, available at https://www.3gpp.org/ftp/tsg_ran/WG1_RL1/TSGR1_50b/Docs (Year: 2007).*
Philippines Office Action Dated Sep. 27, 2013, 3 pages.
Motorola, PMI Downlink Signaling and Pdcch Format, R1-073378, 3GPP Aug. 24, 2007.
R1-074072, "Downlink PMI indication for SU-MIMO", Samsung, server stamp Feb. 10, 2007.
R1-074194, "Downlink control signaling for SU-MIMO", LGE, server stamp Mar. 10, 2007.
R1-074225, "Considerations on DL signaling for support of SU- and MU-MIMO", ZTE, server stamp Feb. 10, 2007.

R1-074227, "MIMO precoding information in PDCCH", Huawei, server stamp Feb. 10, 2007.
R1-074285, "Investigation on PMI Indication Schemes for Single-User MIMO Precoding in E-UTRA Downlink", NTT DoCoMo, server stamp Feb. 10, 2007.
3GPP TS 36.213 V8.4.0 3rd Generation Partnership Project; Technical Specification Group Radio Access Network; Evolved Universal Terrestrial Radio Access(E-UTRA); Physical channels and modulation Sep. 2008 (Release 8).
3GPP TS 36.212 V8.4.0 3rd Generation Partnership Project; Technical Specification Group Radio Access Network; Evolved Universal Terrestrial Radio Access(E-UTRA); Physical channels and modulation Sep. 2008 (Release 8).
"3G Evolution HSPA and LTE for Mobile Broadband", Erik Dahlman, Stefan Parkvall, Johan Skold and Per Beming,2007.
3GPP TS 36.211 V8.4.0 3rd Generation Partnership Project; Technical Specification Group Radio Access Network; Evolved Universal Terrestrial Radio Access(E-UTRA); Physical channels and modulation Sep. 2008 (Release 8.
3GPP TS 36.211 V8.0.0 3rd Generation Partnership Project; Technical Specification Group Radio Access Network; Evolved Universal Terrestrial Radio Access(E-UTRA); Physical channels and modulation Sep. 2007 (Release 8).
R1-073077 "PMI Downlink Signaling and Downlink PDCCH Format", Jun. 25-29, 2007.
3GPP TS 36.212 V8.4.0 (Sep. 2008) 3rd Generation Partnership Project; Technical Specification Group Radio Access Network; Evolved Universal Terrestrial Radio Access (E-UTRA); Multiplexing and channel coding (Release 8).
3GPP TS 36.213 V8.4.0 (Sep. 2008) 3rd Generation Partnership Project; Technical Specification Group Radio Access Network; Evolved Universal Terrestrial Radio Access (E-UTRA); Physical Layer Procedures (Release 8).
3GPP TSG RAN WG1 50 ,Athens, Greece, Aug. 20-24, 2007 R1-073423 "Design Aspects of US Feedback".
3GPP TSG-RAN WG1 #51, Jeju, Korea, Nov. 5-9, 2007 R1-074844 "MIMO Related DL Control Signalling".
Ericsson Notes From Offline Discussions on PDCCH Contents. R-073870, 3GPP Aug. 24, 2007.
"Rank Override Support for Precoder Confirmation" 3GPP TSG-RAN WH1 #52bis Shenzhen, China, Mar. 31-Apr. 4, 2008 R1-081540.
Subset selection for precoding 3GPP TSG RAN WG1 Meeting 50bis Shanghai, China, Oct. 8-12, 2007 R1-074076.
3GPP TSG RAN1#50, R1-073378 (D1), Aug. 2007.
3GPP TSG RAN WG1 #50, R1-073870 (D2), Aug. 2007.
Huawei: "Baseline uplink CQI message—conent and size" 3GPP Draft: RI-061820, XP050111637 (D3).
3GPP TS 36.211 V8.0.0 3rd Generation Partnership Project; Technical Specification Group Radio Access Network; Evolved Universal Terrestrial Radio Access(E-UTRA); Physical channels and modulation (Release 8).
Love, D.J, Heath, R.W., Jr., "Limited feedback unitary precoding for spatial multiplexing systems", IEEE Transactions on Information Theory, vol. 51, issue 8, pp. 2967-2976, Aug. 2005.
R1-074001, "PMI Downlink Signaling for E-UTRA", Motorola; server stamp Mar. 10, 2007.

* cited by examiner

31

20

10

40
45

| One codeword: Codeword 1 enabled, Codeword 2 disabled | | Two codewords: Codeword 1 enabled, Codeword 2 enabled | |
|---|---|---|---|
| 42 Bit field mapped to index | 44 Message | 46 Bit field mapped to index | 48 Message |
| 0 | RI=1: transmit diversity | 0 | RI=2: PMI corresponding to precoder matrix $\frac{1}{2}\begin{bmatrix} 1 & 1 \\ 1 & -1 \end{bmatrix}$ |
| 1 | RI=1: PMI corresponding to precoding vector $\begin{bmatrix} 1 & 1 \end{bmatrix}^T / \sqrt{2}$ | 1 | RI=2: PMI corresponding to precoder matrix $\frac{1}{2}\begin{bmatrix} 1 & 1 \\ j & -j \end{bmatrix}$ |
| 2 | RI=1: PMI corresponding to precoder vector $\begin{bmatrix} 1 & -1 \end{bmatrix}^T / \sqrt{2}$ | 2 | RI=2: Precoding according to the latest PMI report on PUSCH |
| 3 | RI=1: Precoding according to the latest PMI report on PUSCH, if RI=2 reported, use 1$^{st}$ column of all precoders implied by reported PMI(s) and reported RI | 5 | reserved |
| 4 | RI=1: Precoding according to the latest PMI report on PUSCH, if RI=2 reported, use 2$^{nd}$ column of all precoders implied by reported PMI(s) and reported RI | 6 | reserved |

METHODS AND ARRANGEMENTS FOR SIGNALING CONTROL INFORMATION IN A COMMUNICATION SYSTEM

CROSS-REFERENCE TO RELATED APPLICATIONS

This application is U.S. patent application Ser. No. 15/830,065 filed on Dec. 4, 2017, which is a continuation of U.S. patent application Ser. No. 15/084,905 filed Mar. 30, 2016, which is a continuation of U.S. application Ser. No. 14/108,823, filed on Dec. 17, 2013, pending, which is a continuation of U.S. application Ser. No. 12/682,161, filed Aug. 16, 2010, granted, which was the national stage of international application no. PCT/SE08/51138, filed Oct. 7, 2008, which claims the benefit of U.S. provisional application No. 60/978,226, filed Oct. 8, 2007, the disclosure of which is incorporated herein by reference.

TECHNICAL FIELD

The present invention relates to methods and communication devices in a communication system, in particular, to methods and communication devices for signaling control information in a communication system.

BACKGROUND

Multi-antenna techniques may significantly increase the data rates and reliability of a wireless communication system. Performance of the system is in particular improved if both the transmitter and the receiver are equipped with multiple antennas. This use of multiple antennas results in a multiple-input multiple-output (MIMO) communication channel and such systems and/or related techniques are commonly referred to as MIMO.

Evolved UTRAN (E-UTRAN), also called for LTE, is a standard that is currently under development. A core component in LTE is the support of MIMO antenna deployments and MIMO related techniques. In particular, for the downlink a spatial multiplexing mode with channel dependent precoding is supported. The spatial multiplexing mode is aimed for high data rates in favorable channel conditions. In this mode, an information carrying symbol vector $s_k$ is on the base station (eNodeB in LTE) side multiplied by an $N_T \times r$ precoder matrix denoted as $$W_{N_T \times r}.$$

The matrix is often chosen to match the characteristics of the $N_R \times N_T$ MIMO channel, where $N_R$ and $N_T$ represents the number of receive and transmit antennas, respectively. The r symbols in $s_k$ each correspond to a layer and r is referred to as the transmission rank. LTE uses OFDM and hence the $N_R \times 1$ vector received by the user equipment (UE) for a certain resource element on subcarrier k (or alternatively data resource element number k), assuming no inter-cell interference, is thus modeled by $$Y_k = HW_{N_T \times r} s_k + e_k$$

where $e_k$ is a noise vector obtained as realizations of a random process.

The UE may, based on channel measurements in the forward link, transmit recommendations to the base station of a suitable precoder to use. A single precoder that is supposed to cover a large bandwidth (wideband precoding) may be fed back. It may also be beneficial to match the frequency variations of the channel and instead feed back a frequency-selective precoding report, e.g. several precoders, one per subband.

In the field of high rate multi-antenna transmission, one of the most important characteristics of the channel conditions is the so-called channel rank. Roughly speaking, the channel rank may vary from one up to the minimum number of transmit and receive antennas and characterizes how many layers the channel can support for a transmission. In conjunction with precoding, adapting the transmission to the channel rank involves using as many layers as the channel rank. This is facilitated by feedback information from the receiver to the transmitter, Such feedback information may comprise not only which precoder or precoders to use but also a recommendation of the transmission rank (possibly implicitly as part of the precoder information) and quality assessments of the layers/codewords. The latter is often referred to as CQI, Channel Quality Indication while the feedback information related to transmission rank may be referred to as rank indication (RI) which may be used in conjunction with precoder matrix indicator(s) (PMIs) to unambiguously point out one or more precoder matrices.

The payload size of the feedback information may be particularly large if frequency-selective precoding is used. Several precoders/PMIs may then need to be signaled and this may lead to a large signaling overhead. In order to avoid such a large signaling overhead also for the forward link signaling (e.g. in the downlink from eNodeB to UE), it is possible for the transmitter to exploit the fact that the receiver knows what it recommended and hence, instead of explicitly signaling one or more of the recommended precoders, confirm to the receiver that the data transmission is using the same precoders and transmission rank as the receiver recommended. This is often referred to as precoder confirmation/verification and is part of the control information associated with a data transmission in the forward link.

In practice, the feed back reports are far from ideal due to time-variations of the channel and feedback delay, bit errors in the feedback link and mismatch between the assumptions on certain parameters the receiver use for computing/selecting feedback information and what the actual parameter values at the transmitter are. The scheduling bandwidth is one important example of such a parameter.

In LTE, the User Equipment, UE, reports a single recommended rank to the base station (eNodeB in LTE) obtained by inspecting the channel quality as seen over the maximum possible scheduling bandwidth (which may have been semi-statically configured to be smaller than the system bandwidth). The actual bandwidth used when the UE is scheduled might however be considerably smaller. In scenarios with a frequency-selective channel, this means that there is a great risk that the effective rank on the scheduled bandwidth might be entirely different from the "average" transmission rank recommended by the UE.

Documents LG Electronics 3GPP Draft; R1-074194 Downlink Control Signaling for SU-MIMO_LGE, 20071003 3rd Generation Partnership Project (3GPP), Mobile Competence Centre; 650, route des Lucioles; F-06921 Sophia-Antipolis Cedex; France RAN WG1, Shanghai, China; 20071003 R1-074194 "Downlink Control Signaling for SU-MIMO_LGE" XP050107723 and LG electronics 3GPP Draft; R1-074200, 20071002 3rd Generation Partnership Project (3GPP), Mobile Competence Centre; 650, route des Lucioles; F-06921 Sophia-Antipolis Cedex; France, RAN WG1, Shanghai, China; 20071002 R1-074200 "On the implementation of rank override using codeword DTX" XP050107729 disclose rank override.

SUMMARY

It is an object of embodiments to efficiently improve the signaling between a user equipment and a base station.

Embodiments disclose a method in a second communication device for signalling control information associated with transmission of data over a wireless channel. The second communication device receives feedback data from a first communication device, wherein the feedback data comprises an indication of recommended precoders and a recommendation of a first transmission rank to possibly use during transmission of data. The second communication device further determines a second transmission rank to use for transmitting data, and transmits a confirmation message to the first communication device The confirmation message comprises a confirmation that the transmission of data from the second communication device is using at least parts of each recommended precoder associated with a frequency resource that falls within the transmission of data and comprising an indicator of the second transmission rank to use.

It is a basic concept of embodiments to mitigate the problems described above by adding efficient support in the forward link signaling for rank override when precoder report verification is used and in particular in conjunction with frequency-selective precoding. Such rank override support may e.g. include selecting which columns of the recommended precoder matrices to use and also the possibility to signal which layer(s)/codeword(s) should be used and additional or modified codeword to layer mappings.

In addition, a second communication device is disclosed comprising a receiving arrangement adapted to receive feedback data from a first communication device. The feedback data comprises an indication of recommended precoders and a recommendation of a first transmission rank to possibly use during transmission of data. The second communication device further comprises a control unit arranged to determine a second transmission rank to use for transmitting the data, and a transmitting arrangement adapted to transmit a confirmation message to the first communication device. The confirmation message comprises a confirmation that the transmission of data is using at least parts of each recommended precoder associated with a frequency resource that falls within the transmission of data and an indicator of the second transmission rank to use.

Furthermore, embodiments disclose a method in a first communication device for setting the first communication device to an operational mode according to signaled control information associated with transmission of data over a wireless channel.

The first communication device determines recommended precoders and a first transmission rank to possibly use when transmitting data from a second communication device. Feedback data comprising an indication of recommended precoders and the first transmission rank to use during transmission of data is transmitted from the first communication device to the second communication device. The first communication device then receives, from the second communication device, a confirmation message comprising a confirmation that transmission of data from the second communication device is using at least parts of each recommended precoder associated with a frequency resource that falls within the transmission of data and an indicator of the second transmission rank to use. The first communication device then sets itself up in the operational mode to use the at least parts of the confirmed precoder and the second transmission rank to receive and decode transmission of data from the second communication device.

For example, the confirmation message may comprise an indicator of a confirmation of precoders/precoder matrix indicators (PMI) and a transmission rank indicator (TRI) indicating a second transmission rank to be used for the associated data transmission from the second to the first device.

Some embodiments disclose a first communication device comprising a control unit arranged to determine recommended precoders and a first transmission rank to possibly use when transmitting data from a second communication device. The first communication device further comprises a transmitting arrangement adapted to transmit feedback data to the second communication device. The feedback data comprises an indication of the recommended precoders and the first transmission rank to possibly use during transmission. The first communication device further comprises a receiving arrangement arranged to receive, from the second communication device, a confirmation message. The confirmation message comprises a confirmation that transmission of data from the second communication device is using at least parts of each recommended precoder associated with a frequency resource that falls within the transmission of data and an indicator of the second transmission rank that is used. The control unit is further arranged to setup the first communication device in an operational mode to use the at least parts of each confirmed precoder and the second transmission rank during transmission to receive data transmission from the second communication device.

Embodiments disclosed herein propose an efficient way to introduce support for rank override when precoder reporting verification is used. The need of rank override is believed to be common in practice so it is important that efficient support exists to keep the performance of the system high.

BRIEF DESCRIPTION OF THE DRAWINGS

Embodiments will now be described in more detail in relation to the enclosed drawings, in which:

FIG. 4 shows a table of precoding information,

DETAILED DESCRIPTION OF EMBODIMENTS

Figure 1:
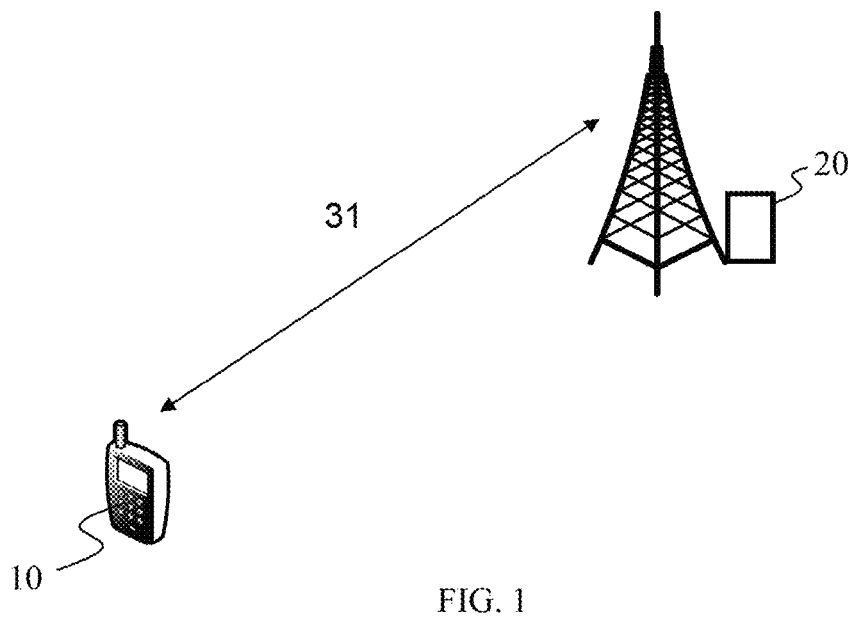
FIG. 1 shows a schematic overview of a first communication device 10 communicating with a second communication device 20.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," when used herein, specify the presence of stated features, steps, operations, and/or components, but do not preclude the presence or addition of one or more other features, steps, operations, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein a communication device may be a wireless communications device. In the context of the invention, the wireless communication device may e.g. be a node in a network such as a base station, a controller, a combination thereof or the like, a mobile phone, a PDA (Personal Digital Assistant) or any other type of portable computer such as laptop computer.

The wireless network between the communication devices may be any network such as an IEEE 802.11 type WLAN, a WiMAX, a HiperLAN, a Bluetooth LAN, or a cellular mobile communications network such as a GPRS network, a third generation WCDMA network, or E-UTRAN. Given the rapid development in communications, there will of course also be future type wireless communications networks with which the present invention may be embodied.

In FIG. 1 a schematic overview of a first communication device 10 communicating with a second communication device over an air interface 31 is shown. The first communication device is illustrated as a UE, such a mobile phone, PDA or the like, and the second communication device is illustrated as a base station, such as a eNodeB, NodeB or the like. It should, however, be understood that the terminology such as base station and UE should be considering non-limiting and does in particular not imply a certain hierarchical relation between the two; in general "base station" could be considered as the first communication device 10 and "UE" the second communication device 20, and these two devices communicate with each other over some radio channel.

In the illustrated example, the user equipment 10, UE, based on channel measurements in the forward link, transmits recommendations to the base station 20 of suitable precoders to use. It may be beneficial to match the frequency variations of the channel and feed back a frequency-selective precoding report, e.g. several precoders, one per sub-band.

Channel dependent precoding as above typically requires substantial signaling support, particularly for frequency-selective precoding. Not only is feedback signaling in the reverse link, as mentioned previously, needed, but typically also signaling in the forward link is required to indicate which precoder was actually used in the forward link transmission since the forward link transmitter might not be certain that it obtained a correct precoder report from the (forward link) receiver.

One way of reducing the signaling overhead in the forward link is to signal some kind of precoder verification/confirmation, e.g., whether the transmitter used the same precoders as fed back by the receiver or not. A single bit could be used for this purpose; a value of 1 could mean that the transmitter follows the feed back information slavishly while a value of 0 could mean that instead another, possibly fixed precoder is used. The value zero would for example be used if the feedback information could not be correctly decoded at the transmitter. Obviously, all this assumes decoding errors in the feedback information can be detected, so the feedback information has to be coded accordingly, e.g. including a CRC, Cyclic Redundancy Check. An alternative to a fixed precoder is to signal a single "wideband" precoder, as exemplified in Table 1. Several variants of precoder report verification/confirmation schemes may be used. Compared with explicitly signaling the frequency-selective precoding report in the forward link, verification/confirmation approaches may substantially reduce the signaling overhead in the forward link. The table 1 below shows an example of forward link signaling to support precoder report verification. K denotes the signaled precoder-related message number in the forward link.

TABLE 1

| k | Message |
|---|---|
| 0, 1, . . . , K – 1 | Precoder index, i.e. pointing out which precoder to use from a codebook of K precoders. |
| K | Transmission uses precoder recommendation from feedback information. |

The encoded bits originating from the same block of information bits are referred to as a codeword. This is also the terminology used in LTE to describe the output from a single HARQ process serving a particular transport block and comprises turbo encoding, rate matching, interleaving etc. The codeword is then modulated and distributed over the antennas. It may make sense to transmit data from several codewords at once, also known as multi-codeword transmission. The first (modulated) codeword may for instance be mapped to the first two antennas and the second codeword to the two remaining antennas in a four transmit antenna system. In the above context of precoding, the codewords are mapped to layers instead of directly to the antennas.

In the field of high rate multi-antenna transmission, one of the most important characteristics of the channel conditions is the so-called channel rank. Roughly speaking, the channel rank may vary from one up to the minimum number of transmit and receive antennas. Taking a 4×2 system as an example, i.e. a system with four transmitting antennas and two receiving antennas, the maximum channel rank is two. The channel rank varies in time as the fast fading alters the channel coefficients. Moreover, it determines how many layers, and ultimately also codewords, that may be successfully transmitted simultaneously. Hence, if the channel rank is one at the instant of transmission of two codewords mapping to two separate layers, there is a strong likelihood that the two signals corresponding to the codewords will interfere so much that both of the codewords are erroneously detected at the receiver.

In conjunction with precoding, adapting the transmission to the channel rank involves typically using as many layers as the channel rank. In the simplest of cases, each layer would correspond to a particular antenna. But the number of codewords may differ from the number of layers, as in LTE.

8

Figure 2:
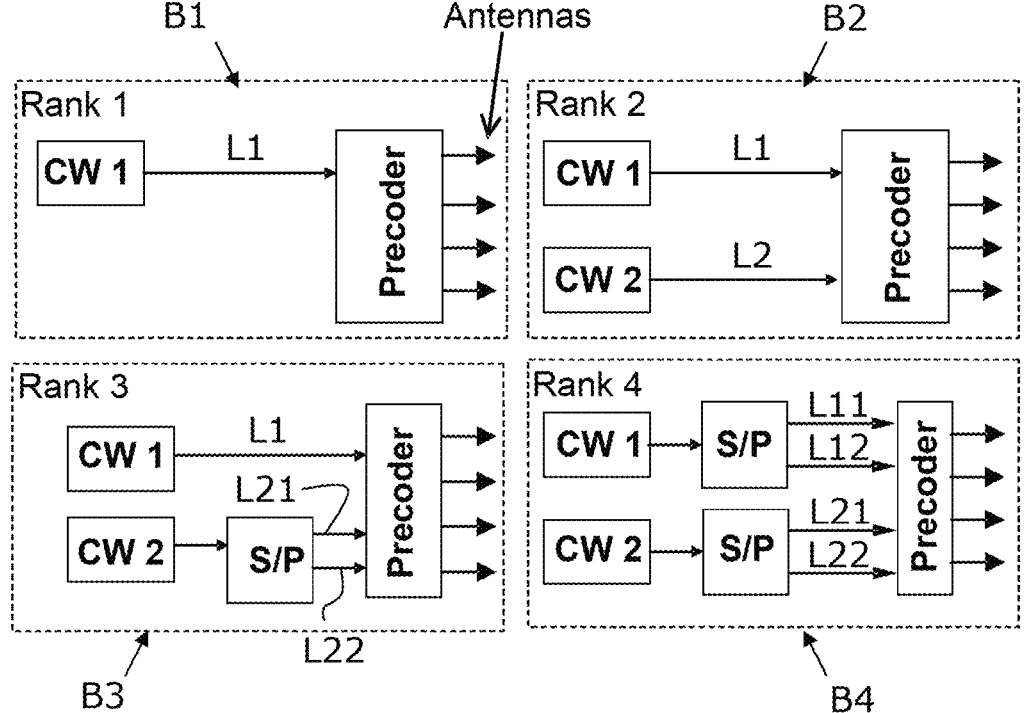
FIG. 2 shows a schematic overview of codeword to layer mapping.

The issue then arises of how to map the codewords to the layers. Taking the current working assumption for the 4 transmit antenna case in LTE as an example, the maximum number of codewords is limited to two while up to four layers may be transmitted. A fixed rank dependent mapping according to FIG. 2 is used. In box B1, rank 1 is shown wherein one codeword CW is used and one layer L1 is transmitted. In box B2, rank 2 is shown wherein two codewords CW1, CW2 are used and two layers L1, L2 are transmitted. In box B3, rank 3 is shown wherein two CWs CW1, CW2 are used and the second CW is split into two layers L21, L22 via a serial to parallel converter S/P, thereby, transmitting on three layers L1, L21, L22. In box 4, rank 4 is shown wherein each CW CW1, CW2 is transmitted on parallel layers via a S/P, thereby, transmitting on four layers L11, L12, L21, L22.

The receiver typically feeds back not only precoder information but also a recommended transmission rank (possibly implicitly as part of the precoder information) and quality assessments of the layers/codewords. The latter is often referred to as CQI. In practice, the feed back reports are far from ideal due to time-variations of the channel and feedback delay, bit errors in the feedback link and mismatch between the assumptions on certain parameters the receiver use for computing/selecting feedback information and what the actual parameter values at the transmitter are. The scheduling bandwidth is one important example of such a parameter. Traffic patterns and limited data buffers size may constitute additional reasons for the base station to wish to use another transmission rank than what the UE has recommended. This is a problem in relation to the previously mentioned precoder confirmation functionality which does not support that the eNodeB uses another transmission rank than what the UE recommended.

The base station 20 may override the rank recommended by the UE in order to achieve some margin against the rank variations over frequency. This may be possible when explicitly signaling the precoder and rank in the downlink, i.e., forward link. However, for the precoder report verification schemes, so far they only consider to signal to the UE that the base station has followed the UE recommendation, meaning that the UE recommended precoders have to be followed.

Such rank override support may e.g. include selecting which columns of the recommended precoder matrices to use and also the possibility to signal which layer(s)/codeword(s) should be used and additional or modified codeword to layer mappings. The latter may be useful even when performing rank override without precoder report confirmation/verification.

To support rank override when precoder report verification is used, additional messages may be signaled in the forward link to specify which rank to use and possibly also which layers, i.e. columns of the recommended precoder(s) to use. The principle is explained by means of examples below.

Inspired by a possible use in LTE, the focus is on when precoder report verification is combined with the possibility to signal multiple precoders The case of up to two layers, for example, two Tx base station or two Tx forward link transmitters, is given in Table 2. As seen, messages give the possibility to select which column of each precoder should be used for the transmission from the Tx base station. In general, a column subset of each precoder could be specified. Another example of messages is given in Table 3 where up to 4 layers, for example, a four Tx base station or a four Tx forward link transmitter, are considered and the fixed codeword to layer mapping present in LTE is taken into account.

Messages may be coded arbitrarily, for example, by simply stating the message number or allocating separate bits for each or of some of the messages, or combinations thereof. Further, the same column numbers, that is, layers, are selected for all relevant precoders over frequency when performing rank override. This strongly limits the number of messages. Extensions may be possible where the same column numbers are not used for all the precoders.

If the recommended rank is lower than the rank stated in the message, the precoder columns could conceivably be taken from the corresponding generating matrix (which always has four columns) instead of from the recommended matrices (which are column subsets of the generating matrices in LTE).

The following table 2 shows an example of a forward link signalling supporting rank override. Also in this example, k denotes the signalled precoder-related message number in the forward link.

TABLE 2

| k | Message |
| --- | --- |
| 0, 1, . . . , K − 1 | Precoder index, i.e. pointing out which precoder to use from a codebook of K precoders. |
| K | Transmission uses precoder recommendation from feedback information |
| K + 1 | Rank 1 transmission on layer/codeword 1 based on precoder recommendation from feedback.<br><br>This means the rank one transmission uses the first column of each recommended precoder matrix as the precoder vector |
| K + 1 | Rank 1 transmission on layer/codeword 2 uses precoder recommendation from feedback.<br><br>This means the rank one transmission uses the second column of each recommended precoder matrix as the precoder vector |

The following table 3 illustrates a 4 Tx example of forward link signaling supporting rank override in conjunction with precoder report verification and fixed codeword-to-layer mapping as described previously.

TABLE 3

| k | Message |
| --- | --- |
| 0, 1, . . . , K − 1 | Precoder index, i.e. pointing out which precoder to use from a codebook of K precoders. |
| K | Transmission uses precoder recommendation from feedback information |
| K + 1 | Rank 1 transmission on codeword 1 based on precoder recommendation from feedback.<br><br>Codeword 1 connects to layer 1 (c.f. FIG. 2) so this means the rank one transmission uses the first column of each recommended precoder matrix as the precoder vector |
| K + 2 | Rank 2 transmission on codewords 1 and 2 uses precoder recommendation from feedback.<br><br>Codeword 1 and 2 connects to layer 1 and 2 (c.f. FIG. 2) so this means the rank two transmission uses the two first columns of each recommended precoder matrix as the precoder matrix |
| K + 3 | Rank 3 transmission on codewords 1 and 2 uses precoder recommendation from feedback.<br><br>Codeword 1 and 2 connects to layer 1 and 2 + 3 (c.f. FIG. 2) so this means the rank three transmission uses the three first columns of each recommended precoder matrix as the precoder |

TABLE 3-continued

| k | Message |
| --- | --- |
| | matrix |
| K + 4 | Rank 4 transmission on codewords 1 and 2 uses precoder recommendation from feedback.<br><br>Codeword 1 and 2 connects to layer 1 + 2 and 3 + 4 (c.f. FIG. 2) so this means the rank four transmission uses all columns of each recommended precoder matrix as the precoder matrix |

It would also be possible to add codeword-to-layer mappings to improve rank override even further. Particularly important mappings to add are those that make the codeword to layer mapping as "complete" as possible. A complete mapping is loosely taken to mean a mapping in which it is always possible to override the rank downwards with as few changes of which layers a certain codeword connects to. One way to strive for that is to ensure that there are messages so that a codeword can always be transmitted by itself on the same layers as if the codeword is transmitted in conjunction with other codeword(s). Upon inspecting the codeword to layer mapping in FIG. 2, it can be seen that the mappings in FIG. 3 are also useful when overriding the rank in order to strive for completeness.

Referring back to FIG. 2, wherein examples of codeword CW to layer mappings are shown. In the illustrated examples Rank one is shown in the upper left box B1 and Rank two is shown in the upper right box B2. Rank three is shown in the lower left box B3 and Rank four is shown in the lower right box B4.

Figure 3:
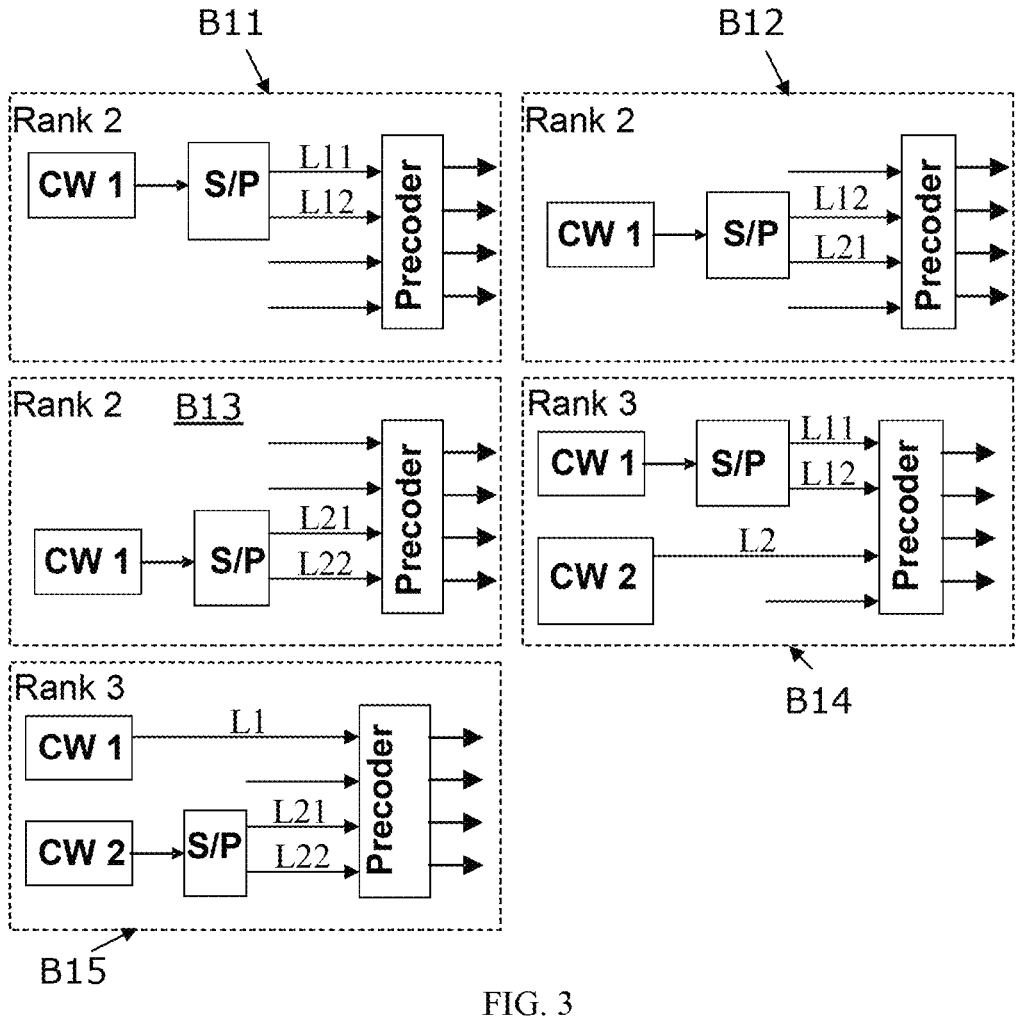
FIG. 3 shows a schematic overview of codeword to layer mapping.

In FIG. 3 examples of codeword CW to layer mappings are shown. In the illustrated different examples of rank two, as well as rank three, are shown using different layer configurations.

In box B11, rank two is shown using two layers L11, L12. In box B12, rank two is shown using two layers L12, L21. In box B13, rank two is shown using two layers L21, L22.

In box B14, rank three is shown using three layers L11, L12, L2. In box B15, rank three is shown using three layers L1, L21, L22.

Some or all of the above mappings shall be available for rank override if the CQIs are reported per codeword (as opposed to per layer) as in LTE. Consider for example the codeword to layer mapping in FIG. 2 and assume a feedback report recommending rank four but the base station wishes to override to rank two. Since the CQI is tied to the codeword and not the layers, the base station does not know the CQI for codeword 1 and 2 in the rank two case. But if we make the upper left mapping in FIG. 3, B11, available for override, then rank override may be accomplished without introducing additional link adaptation errors due to having to split one CQI into two. In addition, a message could be added to indicate that rank override should be performed to this particular mapping.

Additional mappings and corresponding messages for the purpose of rank override could also be added to better support rank override from rank four to rank three. A simple solution would be to add the mapping where codeword 1 and 2 connect to layer L11+L12 and L21, respectively. An alternative is to specify which layers (i.e. columns) the codeword(s) should be mapped to in the message. These messages may for example say Rank one transmission with codeword 1 on layer n based on precoder recommendation from feedback, meaning that the rank one transmission uses the n:th column of each recommended precoder matrix as the precoder vector.

Rank three transmission with codeword 1 on layer L12 and codeword 2 on layers L21+L22 based on precoder recommendation from feedback (meaning that the rank three transmission uses the three last columns of each recommended precoder matrix as the precoder matrix).

In FIG. 4 a schematic table indicating precoding information is shown. In a first column 40, a first CW is enabled and in a second column 45 a first and a second CW is enabled. In each column a bit field mapped to index 42, 46 indicates a transmission rank and a confirmation of a precoder/s used defined in column 44, 48, respectively.

Figure 5:
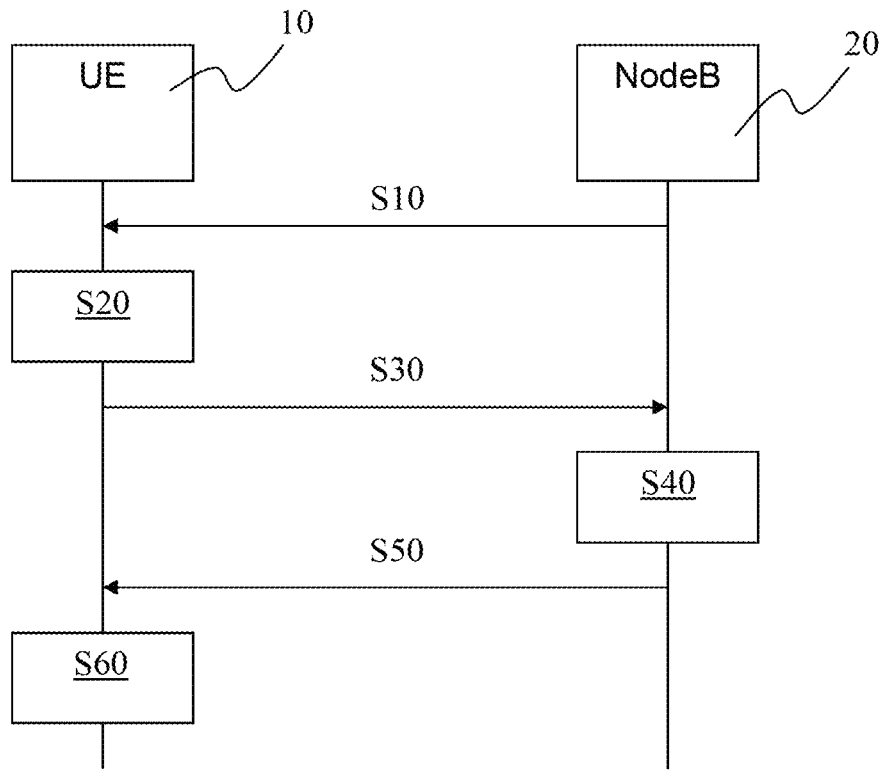
FIG. 5 shows a combined signal and method diagram between a UE and a NodeB.

In FIG. 5, an example of a combined signaling and method diagram between a user equipment 10 and a base station NodeB 20 is shown.

In step S10, the NodeB 20 signals on a forward link data received by the UE 10. The data may be broadcasted, unicasted or the like.

In step S20, the UE 10 processes the received signal by, for example, performing channel measurements on the forward link or the like. The UE 10 then determines recommended precoders to use and a transmission rank to use, based on, for example, the channel measurement or the like.

In step S30, the UE 10 performs a feedback transmission from the UE 10 to the NodeB comprising the recommended precoders to use and the recommended transmission rank to use in a message to the NodeB 20. The message may also include quality assessments, such as CQI and/or the like.

In step S40, the NodeB 20 receives the message of recommendations in the feedback transmission and processes the message, retrieving the recommended precoders and the recommended transmission rank to use. The NodeB 20 then performs a determining step to determine an actual second transmission rank to use. This may be performed by analyzing load in the cell, frequency bands used, ACK/NACK statistics of previous transmissions, path loss and/or the like.

In step S50, the NodeB 20 then performs transmission of control information associated with data transmission comprising a confirmation message to the UE 10 comprising a confirmation that the recommended precoders or parts of the recommended precoder are used and an indicator of the actual second transmission rank to be used. This transmission of control information is needed for the UE 10 to understand how to perform decoding of data transmission, that is, useful information to be conveyed to the UE 10.

In step S60, the UE 10 receives the confirmation message in the transmission of control information and uses the confirmation message to set up the UE 10 into an operational mode using the confirmed precoders or the confirmed parts of the recommended precoders and the actual transmission rank to receive and decode data from the eNodeB 20.

Additional signaling overhead required for introducing the method may be considered very low as only a very limited number of extra messages in the forward link needs to be introduced.

Figure 6:
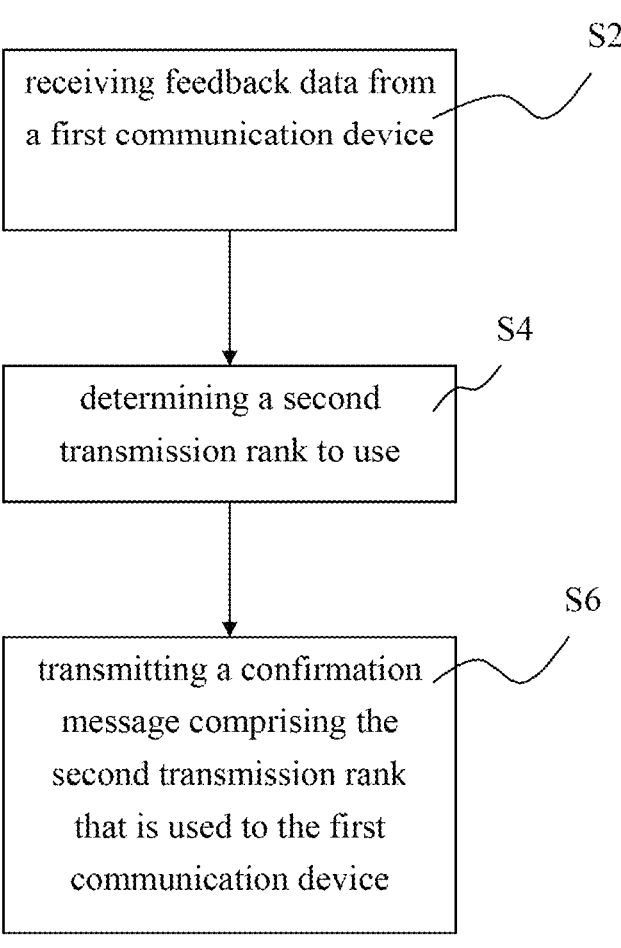
FIG. 6 shows a schematic flow chart of a method in a second communication device.

In FIG. 6, a schematic flow chart in a second communication device for signalling control information associated with transmission of data over a wireless channel is shown.

In step S2, first feedback data is received from a first communication device comprising an indication of recommended precoders and a first transmission rank to possibly use during transmission. In some embodiments, the indication of recommended precoders corresponds to a frequency-selective precoding report.

In step S4, the second communication device determines a second transmission rank to use during transmission, wherein the second communication device may, in some embodiments, be arranged to evaluate load in a communication network wherein the first communication device is camped and based on the evaluation the second communication device is arranged to determine second transmission rank to use.

In some embodiments, the step of determining second transmission rank may comprise to take into account the band of frequency used for transmission. The step of determining second transmission rank may also, in some embodiments, be based on scheduling of transmission in a cell of the second communication device.

In step S6, the second communication device performs a transmission of control information comprising a confirmation message to the first communication device. The confirmation message comprises a confirmation that transmission of data from the second communication device is using at least parts of each recommended precoder associated with a frequency resource that falls within the transmission of data and an indicator of the second transmission rank to use.

It should be understood that the confirmation message may comprise a pointer indicating in a table of precoding information confirmation of the precoder used and the determined used second transmission rank. The table of precoding information may, in some embodiments, comprise messages allowing a codeword to be individually transmitted on the same layers as the layers used for transmitting the codeword in combination with other codewords as long as the transmission rank is not lower than the number of layers for the codeword.

In some embodiments, the parts of each recommended precoder correspond to a column subset of the associated recommended precoder or a column subset of a generating matrix corresponding to the associated recommended precoder. In some embodiments, each column subset has the same number of columns and the number of columns corresponds to the second transmission rank. In some embodiments, the column subsets are selected from the same columns of the recommended precoders or from the same columns of generating matrices corresponding to the recommended precoders.

For example, in a first case each column subset has the same number of columns, columns 1 and 2 from all the recommended precoders. However, it should be understood that this does not mean that every precoder to be used will be the same whereas a recommended precoder of a first sub band is typically different than a recommended precoder of a second sub band.

In some embodiments, the indication of second transmission rank is expressed as which layer/s to which codeword/s to use.

In some embodiments, the indication of recommended precoders corresponds to reporting precoder matrix indicators PMIs, the indication of a first transmission rank corresponds to reporting a rank indicator RI, and the indication of a second transmission rank corresponds to signalling a transmission rank indication TRI.

In order to perform the steps of the method a second communication device is provided.

Figure 7:
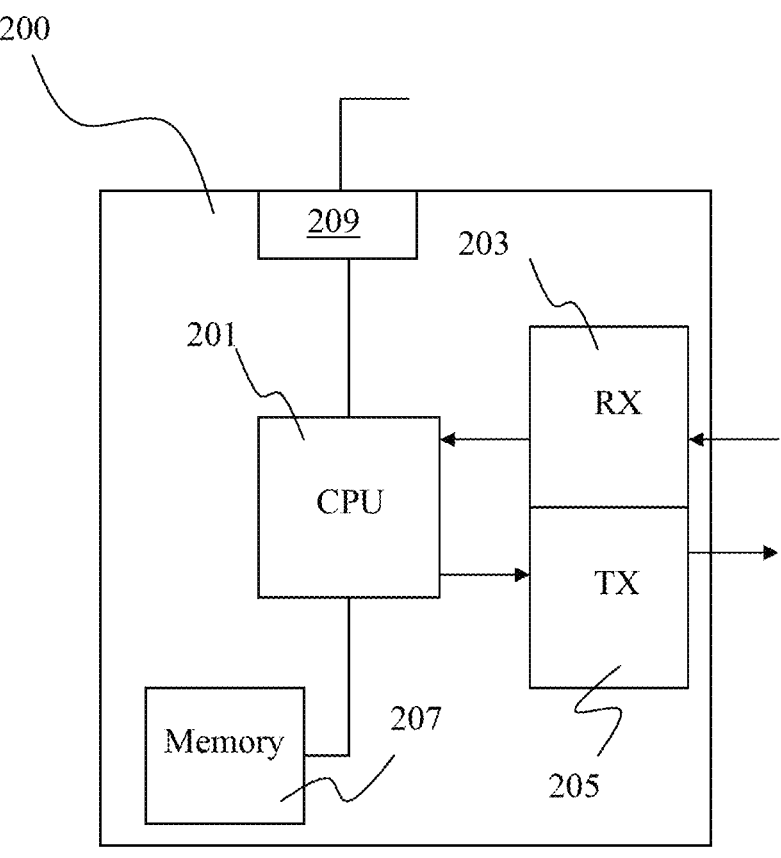
FIG. 7 shows a schematic overview of a second communication device.

In FIG. 7, a schematic overview of a second communication device 20 is shown.

The second communication device 20 is illustrated as a base station, such as a eNodeB, NodeB or the like. It should, however, be understood that the terminology such as base station and UE should be considering non-limiting and does in particular not imply a certain hierarchical relation between the two; in general "base station" could be considered as the first communication device 10 and "UE" the second communication device 20, and these two devices communicate with each other over some radio channel The second communication device 20 comprises a receiving arrangement RX 203 adapted to receive data from a first communication device, wherein the data comprises an indication of recommended precoders and a recommendation of a first transmission rank to possibly use during transmission of data. In some embodiments, the indication of recommended precoders corresponds to a frequency-selective precoding report.

The second communication device 20 further comprises a control unit CPU 201 arranged to determine a second transmission rank to use for transmitting data, and a transmitting arrangement TX 205 adapted to transmit a confirmation message to the first communication device. The confirmation message comprises a confirmation that the transmission of data is using at least parts of each recommended precoder associated with a frequency resource that falls within the transmission of data and an indicator of the second transmission rank to use.

The confirmation message may, in some embodiments, comprise a pointer indicating in a table of precoding information confirmation and determined used transmission rank. The table may be stored in a memory unit 207 of the second communication device 20.

The table of precoding information may comprise messages allowing a codeword to be individually transmitted on the same layers as the layers used for transmitting the codeword in combination with other codewords as long as the transmission rank is not lower than the number of layers for the codeword.

In some embodiments, parts of each recommended precoder may correspond to a column subset of the associated recommended precoder or a column subset of a generating matrix corresponding to the associated recommended precoder. The column subset may stored on the memory unit 207 of the second communication device, being an internal/external memory unit. Each column subset may in some embodiments have the same number of columns and the number of columns corresponds to the second transmission rank.

In addition, the column subsets may all be selected from the same columns of the recommended precoders or from the same columns of generating matrices corresponding to the recommended precoders.

In some embodiments, the indication of second transmission rank may be expressed as which layer/s to which codeword/s to use.

The control unit 201 may further be arranged to determine the second transmission rank based on load in a communication network wherein the first communication device is camped, the band of frequency used for transmission, and/or scheduling of transmission within a cell of the second communication device. The control unit 201 may be arranged to evaluate load in the network.

In some embodiments, the indication of recommended precoders corresponds to reporting precoder matrix indicators (PMIs), the indication of a first transmission rank corresponds to reporting a rank indicator (RI), and the indication of a second transmission rank corresponds to signalling a transmission rank indication (TRI).

In the illustrated example the second communication device 20 may further comprise an interface 209 to connect to a network or the like.

The control unit 201 may, in some embodiments, be a central processor unit, a microprocessor, a plurality of processors and/or the like. The memory unit 207 may be a single unit, a plurality of memory units, internal and/or external memory.

Figure 8:
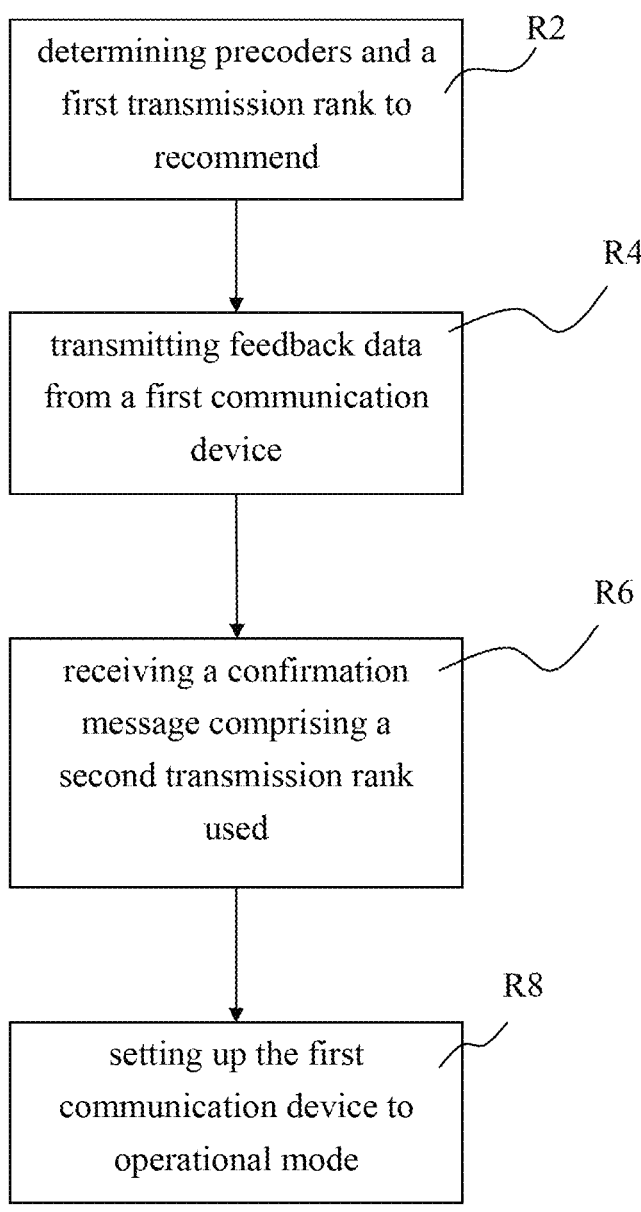
FIG. 8 shows a schematic flow chart of a method in a first communication device.

In FIG. 8, a schematic flow chart of a method in a first communication device for setting the first communication device to an operational mode according to signalled control information associated with transmission of data over a wireless channel is shown.

In step R2, the first communication device determines precoders and a first transmission rank to possibly use during transmission of data from the second communication device. The decision may be based on the channel quality, for example, a channel measurement in a forward link to the first communication device from a second communication device and/or the like.

In step R4, the first communication device transmits feedback data comprising an indication of recommending the determined precoders and the first transmission rank to use to the second communication device. In some embodiments, the indication of recommended precoders corresponds to a frequency-selective precoding report.

In step R6, the first communication device receives control signalling comprising a confirmation message from the second communication device on a radio channel, such as a broadcast channel, unicast channel, or the like. The confirmation message comprising a confirmation that transmission of data from the second communication device is using at least parts of each recommended precoder associated with a frequency resource that falls within the transmission of data and an indicator of the second transmission rank used.

The confirmation message may further comprise a pointer indicating in a table of precoding information confirmation of precoder and the second transmission rank. The table of precoding information may, in some embodiments, comprise messages allowing a codeword to be individually transmitted on the same layers as the layers used for transmitting the codeword in combination with other codewords as long as the transmission rank is not lower than the number of layers for the codeword. The first communication device reads the pointer to determine precoders and second transmission rank.

In some embodiments, the parts of each recommended precoder correspond to a column subset of the recommended precoder or a column subset of a generating matrix corresponding to the recommended precoder. In some embodiments, each column subset has the same number of columns and the number of columns corresponds to the second transmission rank. In some embodiments, the column subsets are selected from the same columns of the recommended precoders or from the same columns of generating matrices corresponding to the recommended precoders.

In some embodiments, the indication of second transmission rank is expressed as which layer/s to which codeword/s to use.

In some embodiments, the indication of recommended precoders corresponds to reporting precoder matrix indicators PMIs, the indication of a first transmission rank corresponds to reporting a rank indicator RI, and the indication of a second transmission rank corresponds to signalling a transmission rank indication TRI.

In step R8, the first communication device sets up itself in an operational mode. The operational mode uses the second transmission rank and the confirmed at least parts of each recommended precoder to receive and decode the transmission of data from the second communication device.

In order to perform the steps of the method a first communication device is provided.

Figure 9:
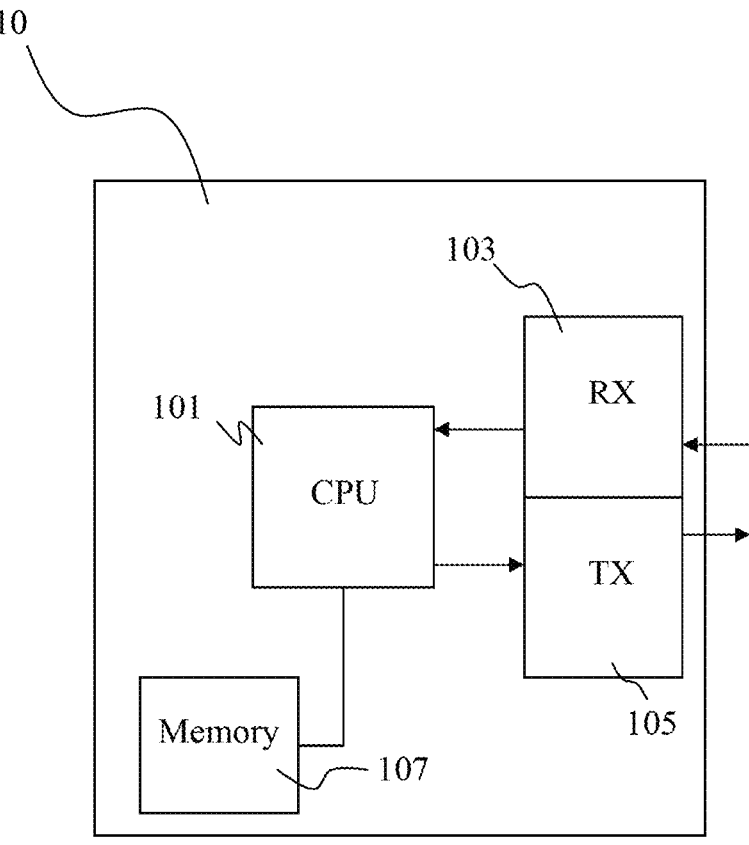
FIG. 9 shows a schematic overview of a first communication device.

In FIG. 9, a schematic overview of a first communication device 10 is shown.

The first communication device is illustrated as a UE, such a mobile phone, PDA or the like. It should, however, be understood that the terminology such as base station and UE should be considering non-limiting and does in particular not imply a certain hierarchical relation between the two; in general "base station" could be considered as the first communication device 10 and "UE" a second communication device 20, and these two devices communicate with each other over some radio channel.

The first communication device comprises a control unit 101, such as a microprocessor or the like, arranged to determine recommended precoders and a first transmission rank to possibly use when a second communication device is transmitting data. The determination may be based on channel measurement/s of received data on a channel from a second communication device.

The first communication device 10 further comprises a transmitting arrangement 105 arranged to transmit feedback data to the second communication device. The feedback data comprises an indication of recommended precoders and the first transmission rank to possibly use during transmission. The first communication device 10 further comprises a receiving arrangement 103 arranged to receive, from a second communication device, a confirmation message comprising a confirmation that transmission of data from the second communication device is using at least parts of each recommended precoder associated with a frequency resource that falls within the transmission of data and an indicator of the second transmission rank that is used. The control unit 101 is further arranged to setup the first communication device in an operational mode to use the confirmed at least parts of each recommended precoder and the second transmission rank to receive and decode data from the second communication device.

The control unit 101 may, in some embodiments, further be arranged to perform a channel measurement on a forward link and arranged to determine a recommended precoder and a first transmission rank based on the channel measurement.

In some embodiments, the first communication device 10 may further comprise a table of precoding information, and the confirmation message comprises a pointer indicating in the table confirmation of precoder and the second transmission rank and wherein the control unit 101 is arranged to read the pointer to setup the first communication device into the operational mode. The table may be stored on a memory unit 107, wherein the memory unit may comprise a single unit, a plurality of units; external and/or internal memories.

The table of precoding information may comprise messages allowing a codeword to be individually transmitted on the same layers as the layers used for transmitting the codeword in combination with other codewords as long as the transmission rank is not lower than the number of layers for the codeword.

In some embodiments, the parts of each recommended precoder correspond to a column subset of the recommended precoder or a column subset of a generating matrix corresponding to the recommended precoder. In some embodiments, each column subset has the same number of columns and the number of columns corresponds to the second transmission rank. In some embodiments, the column subsets are selected from the same columns of the recommended precoders or from the same columns of generating matrices corresponding to the recommended precoders.

In some embodiments, the indication of second transmission rank is expressed as which layer/s to which codeword/s to use.

In some embodiments, the indication of recommended precoders corresponds to reporting precoder matrix indicators PMIs, the indication of a first transmission rank corresponds to reporting a rank indicator RI, and the indication of a second transmission rank corresponds to signalling a transmission rank indication TRI.

Although terminology from the standardization of LTE in the 3rd Generation Partnership Project (3GPP) has been used in the description to exemplify the invention, this should not be seen as limiting the scope of the invention to only the aforementioned system. Other wireless systems, including WCDMA, WiMax, UMB and GSM, may also benefit from exploiting the ideas covered within this disclosure.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A user equipment for communicating with a base station over a radio channel, the user equipment comprising:
   a processor for determining a plurality of recommended precoders, one recommended precoder per subband, and a recommended transmission rank to possibly use when transmitting data from a base station;
   a transmitter for transmitting feedback data to the base station, wherein the feedback data comprise an indication of the recommended precoders, one recommended precoder per subband, and the recommended transmission rank; and
   a receiver for receiving from the base station a message, coded with a message number which points to an entry of a table, the message comprising
      a confirmation that transmission of data from the base station is using a column subset of each recommended precoder, and
      an indicator of a transmission rank to be used,
   wherein said indicator also indicates which column or columns of each recommended precoder to use to support the transmission rank to be used, wherein the indicator indicates the same column number or column numbers for each recommended precoder, and wherein the user equipment is configured to use the indicated transmission rank and the indicated column or columns of each recommended precoder to receive transmissions from the base station, wherein the same column number or column numbers are used for each recommended precoder.

2. A base station for communicating with a user equipment over a radio channel, the base station comprising:
   a receiver for receiving feedback data from the user equipment, wherein the feedback data comprise an indication of a plurality of recommended precoders, one recommended precoder per subband and a recommended transmission rank; and
   a transmitter for transmitting to the user equipment a message, coded with a message number which points to an entry of a table, the message comprising a confirmation that transmission of data from the base station is using a column subset of each recommended precoder, and an indicator of a transmission rank to be used, wherein said indicator also indicates which column or columns of each recommended precoder to use to support the transmission rank to be used, wherein the indicator indicates the same column number or column numbers for each recommended precoder, and wherein the base station is configured to use the indicated transmission rank and the indicated column or columns of each recommended precoder for transmissions to the user equipment, wherein the same column number or column numbers are used for each recommended precoder.

3. A method of operating a user equipment for communicating with a base station over a radio channel, the method comprising:

determining a plurality of recommended precoders, one recommended precoder per subband, and a recommended transmission rank to possibly use when transmitting data from a base station;

transmitting feedback data to the base station, wherein the feedback data comprise an indication of the recommended precoders, one recommended precoder per subband, and the recommended transmission rank;

receiving from the base station a message, coded with a message number which points to an entry of a table, the message comprising a confirmation that transmission of data from the base station is using a column subset of each recommended precoder, and an indicator of a transmission rank to be used, wherein said indicator also indicates which column or columns of each recommended precoder to use to support the transmission rank to be used, wherein the indicator indicates the same column number or column numbers for each recommended precoder; and using the indicated transmission rank and the indicated column or columns of each recommended precoder to receive transmissions from the base station, wherein the same column number or column numbers are used for each recommended precoder.

4. The method according to claim 3, wherein the feedback data to the base station comprise a single recommended transmission rank.

5. The method according to claim 3, wherein the transmitting feedback data to the base station furthermore comprises feeding back quality assessments of layers or codewords.

6. The method according to claim 3, wherein said message is coded by stating a message number.

7. A method of operating a base station for communicating with a user equipment over a radio channel, the method comprising:

receiving feedback data from the user equipment, wherein the feedback data comprise an indication of a plurality of recommended precoders, one recommended precoder per subband, and a recommended transmission rank; and transmitting to the user equipment a message, coded with a message number which points to an entry of a table, the message comprising a confirmation that transmission of data from the base station is using a column subset of the recommended precoders, one recommended precoder per subband, and an indicator of a transmission rank to be used, wherein said indicator also indicates which column or columns of each recommended precoder to use to support the transmission rank to be used, wherein the indicator indicates the same column number or column numbers for each recommended precoder.

8. The method according to claim 7, wherein the feedback data furthermore comprises quality assessments of layers or codewords.

9. The method according to claim 7, wherein said message is coded by stating a message number.

10. The method according to claim 7, wherein the message furthermore comprises codeword-to-layer mapping, wherein the base station applies the codeword-to-layer mapping indicated in the message.

11. A method of operating a user equipment for communicating with a base station over a radio channel, the method comprising:

determining a plurality of recommended precoders, one recommended precoder per subband, and a recommended transmission rank for transmitting data from the base station;

transmitting to the base station an indication of the recommended precoders, one recommended precoder per subband, and the recommended transmission rank;

receiving from the base station a message, coded with a message number which points to an entry of a table, the message comprising a confirmation that transmission of data from the base station is using a column subset of each recommended precoder, wherein the subset is smaller than the recommended precoder, and an indicator of a transmission rank to be used, wherein said indicator also indicates which column subset of each recommended precoder to use to support the transmission rank to be used, wherein the indicator indicates the same column number or column numbers for each recommended precoder; and using the indicated transmission rank and the column subset of each recommended precoder to receive transmissions from the base station, wherein the same column number or column numbers are used for each recommended precoder.

* * * * *